United States Patent
Thompson et al.

(10) Patent No.: US 9,360,042 B2
(45) Date of Patent: Jun. 7, 2016

(54) BEARING SLEEVE FOR AIR BEARING

(71) Applicant: Honeywell International, Inc., Morris Plains, NJ (US)

(72) Inventors: Glenn F. Thompson, Morris Plains, NJ (US); Mark Mackey, Morris Plains, NJ (US); John Sontag, Morris Plains, NJ (US); John Mason, Torrance, CA (US); Rick Johnson, Torrance, CA (US); Mike Guidry, Redondo Beach, CA (US); Patrick Beresewicz, La Mirada, CA (US); Keith Alan Hurley, Morris Plains, NJ (US); Marshall Saville, Morris Plains, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/253,319

(22) Filed: Apr. 15, 2014

(65) Prior Publication Data
US 2015/0292552 A1  Oct. 15, 2015

(51) Int. Cl.
*F16C 17/02* (2006.01)
*F16C 27/02* (2006.01)
(Continued)

(52) U.S. Cl.
CPC .............. *F16C 17/024* (2013.01); *F16C 43/02* (2013.01); *F01D 25/22* (2013.01); *F16C 33/06* (2013.01); *Y10T 29/49639* (2015.01); *Y10T 29/49643* (2015.01)

(58) Field of Classification Search
CPC .. F16C 17/024; F16C 27/063; F16C 2360/24; F16C 2322/50; F16C 33/06; Y10T 29/49639; Y10T 29/49643

USPC ................. 384/103–106; 29/898.02
See application file for complete search history.

(56) References Cited

U.S. PATENT DOCUMENTS 5,427,455 A    6/1995  Bosley
5,634,723 A *  6/1997  Agrawal ........................ 384/106
(Continued)

FOREIGN PATENT DOCUMENTS

JP    2002 005159 A       1/2002
KR     101068542 B1 *     9/2011    ............ F16C 17/024
(Continued)

OTHER PUBLICATIONS

European Search Report for Application No. EP 15 16 2293 dated Oct. 9, 2015.

*Primary Examiner* — Marcus Charles
(74) *Attorney, Agent, or Firm* — Alston & Bird LLP

(57) ABSTRACT

An air bearing assembly is provided that includes a bearing sleeve that has two slots side-by-side having rectangular profiles for engaging the ends of first and second bearing foils for supporting a shaft of a dual-stage compressor. The first rectangular-profile slot, which may be made using a broaching process, is designed to receive first ends of the first bearing foil and the second bearing foil. The second rectangular-profile slot, which may also be made using a broaching process, is designed to receive a second end of the second bearing foil. This dual-slot design replaces the complex "L" shaped single slot design of conventional bearing sleeves, allowing for high-volume, low-cost manufacturing of the bearing sleeves. The dual-slot design also provides for robust engagement of the bearing foils with the bearing sleeves, while allowing easy assembly and installation of the air bearing assemblies.

19 Claims, 8 Drawing Sheets

(51) Int. Cl.
*F16C 43/02* (2006.01)
*F16C 33/06* (2006.01)
*F01D 25/22* (2006.01)

(56) References Cited

U.S. PATENT DOCUMENTS

| | | | |
|---|---|---|---|
| 5,911,510 A * | 6/1999 | Saville | 384/103 |
| 6,964,522 B2 | 11/2005 | Kang et al. | |
| 7,553,086 B2 * | 6/2009 | Kang et al. | 384/103 |
| 8,029,194 B2 * | 10/2011 | Agrawal et al. | 384/106 |
| 8,353,631 B2 * | 1/2013 | Kim | 384/103 |
| 8,371,799 B2 | 2/2013 | Spathias et al. | |
| 2005/0163407 A1 * | 7/2005 | Kang et al. | 384/106 |
| 2007/0047858 A1 | 3/2007 | Hurley et al. | |
| 2008/0310779 A1 * | 12/2008 | Agrawal et al. | 384/106 |
| 2011/0052110 A1 | 3/2011 | Kim | |
| 2012/0251300 A1 * | 10/2012 | Struziak | 415/170.1 |
| 2013/0011211 A1 * | 1/2013 | Heshmat et al. | 408/56 |
| 2014/0169708 A1 | 6/2014 | Omori | |

FOREIGN PATENT DOCUMENTS

| | | | | |
|---|---|---|---|---|
| KR | 101163745 B1 * | 7/2012 | | F16C 27/02 |
| WO | WO 2011025087 A1 * | 3/2011 | | F16C 17/024 |
| WO | WO 2013/024674 A1 | 2/2013 | | |
| WO | WO 2013/028507 A2 | 2/2013 | | |

* cited by examiner

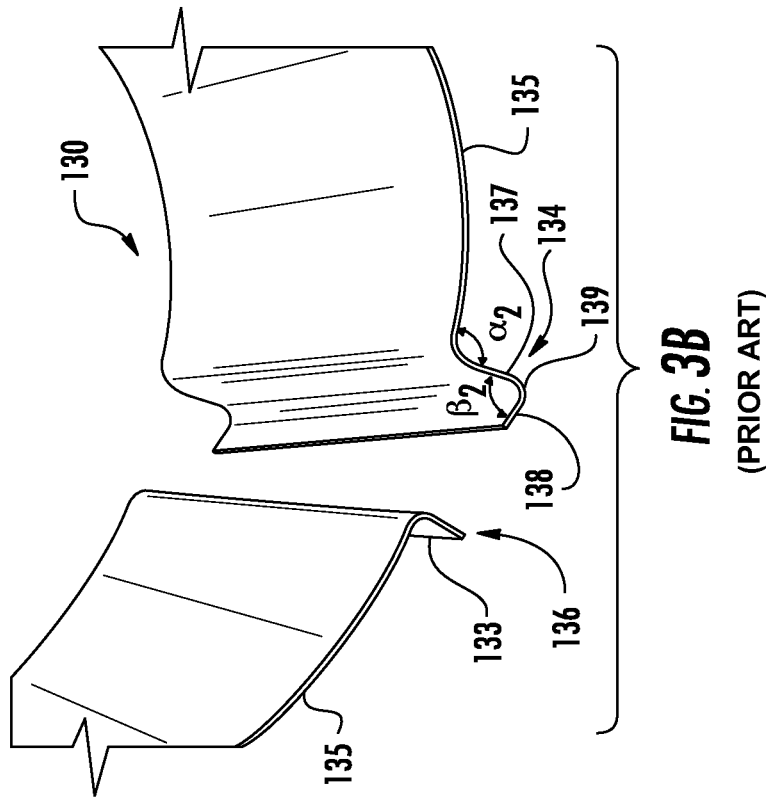
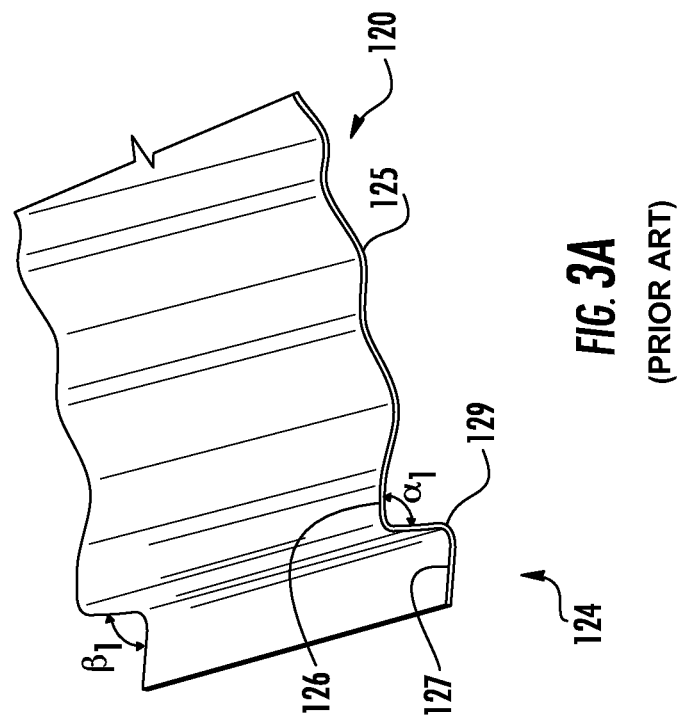

BEARING SLEEVE FOR AIR BEARING

BACKGROUND

The present invention relates to bearing sleeves used in foil air bearing assemblies for turbomachinery shafts, such as for use with turbochargers or fuel cell turbocompressors.

Air compressors are employed in conjunction with internal combustion engine systems and fuel cells for various purposes. For example, an exhaust gas-driven turbocharger is used in conjunction with an internal combustion engine for increasing the power output by compressing charge air delivered to the air intake of the engine to be mixed with fuel and burned in the engine. By providing compressed air to the intake manifold of the engine, the engine is able to produce more power and to work more efficiently. In conventional turbochargers, exhaust gas enters a turbine side of the turbocharger and serves to spin the turbine, which is mounted to one end of a shaft. A compressor wheel is mounted to the other end of the shaft. Rotation of the turbine rotates the compressor wheel and compresses the air for delivery to the engine intake.

Similarly, a compressor, such as a dual-stage or series compressor, can be used to increase the efficiency of a fuel cell by providing compressed air to the cathode side of the fuel cell. In a dual-stage compressor, a low pressure compressor wheel is provided at one end of a shaft, and a high pressure compressor wheel is provided at the other end of the shaft. Air entering the low pressure side of the dual-stage compressor is compressed, and the compressed air is passed on to the high pressure side for a further increase in pressure.

In either case, a shaft connects the two rotating elements (the turbine and the compressor wheel or the low pressure compressor wheel and the high pressure compressor wheel). This rotating shaft is typically supported by one or more bearings.

BRIEF SUMMARY

Embodiments of the present invention are directed to air bearing assemblies and, in particular, bearing sleeves used in air bearing assemblies for a turbomachinery shaft, such as used in a turbocharger or in a dual-stage compressor for a fuel cell, where the bearing sleeves are simpler and more cost effective to produce and provide a design that is more easily manufactured for different sizes and configurations of dual-stage compressors.

In one embodiment, for example, an air bearing assembly for a turbomachinery shaft is provided that comprises a bearing sleeve, a first bearing foil, and a second bearing foil. The bearing sleeve may be configured to support a turbomachinery shaft and may define an inner surface. The first bearing foil may be disposed proximate the inner surface of the bearing sleeve, and the second bearing foil may be disposed between the first bearing foil and the shaft supported by the bearing sleeve. The inner surface of the bearing sleeve may define a first retention slot configured to engage a first end of the first bearing foil and a first end of the second bearing foil. The inner surface of the bearing sleeve may define a second retention slot spaced from the first retention slot and configured to engage a second end of the second bearing foil, such that the first and second bearing foils are maintained in engagement with the bearing sleeve via engagement of the respective ends with a corresponding one of the first and second retention slots.

In some cases, a cross-section of at least one of the first or second retention slots may consist of two opposing linear sidewalls and an endwall extending linearly therebetween. For example, a cross-section of each of the first and second retention slots may consist of two opposing linear sidewalls and an endwall extending linearly therebetween. The first bearing foil may comprise a plurality of first bearing foils configured to be arranged in series around a circumference of the inner surface of the bearing sleeve, and the inner surface of the bearing sleeve may define a plurality of first retention slots configured to engage corresponding first ends of the plurality of first bearing foils. The inner surface of the bearing sleeve may define a single second retention slot disposed proximate only one of the plurality of first retention slots.

Additionally or alternatively, the first end of the first bearing foil may comprise a tang defining an L-bend, where the tang is configured to engage the first retention slot such that a first leg of the L-bend is disposed proximate a sidewall of the first retention slot and a second leg of the L-bend is disposed proximate an endwall of the first retention slot. The first end of the second bearing foil may comprise a straight tang and a second end of the second bearing foil may comprise a straight tang. In some cases, the first retention slot may be configured to extend a length that is equal to a length of the bearing sleeve, and the second retention slot may be configured to extend a length that is equal to the length of the bearing sleeve.

In other embodiments, bearing sleeve for an air bearing assembly is provided that is configured to support a turbomachinery shaft, where an inner surface of the bearing sleeve defines a first retention slot and a second retention slot. The first retention slot may be configured to engage a first end of a first bearing foil and a first end of a second bearing foil. The second retention slot may be configured to engage a second end of the second bearing foil, where the first and second bearing foils are maintained in engagement with the bearing sleeve via engagement of the respective ends with a corresponding one of the first and second retention slots such that the first bearing foil is disposed proximate the inner surface of the bearing sleeve and the second bearing foil is disposed between the first bearing foil and the shaft supported by the bearing sleeve.

In some cases, a cross-section of at least one of the first or second retention slots may consist of two opposing linear sidewalls and an endwall extending linearly therebetween. For example, a cross-section of each of the first and second retention slots may consist of two opposing linear sidewalls and an endwall extending linearly therebetween. The inner surface of the bearing sleeve may define a plurality of first retention slots configured to engage corresponding first ends of a plurality of first bearing foils, and the plurality of first bearing foils may be configured to be arranged in series around a circumference of the inner surface of the bearing sleeve. The inner surface of the bearing sleeve may define a single second retention slot disposed proximate only one of the plurality of first retention slots. Additionally or alternatively, the first retention slot may be configured to extend a length that is equal to a length of the bearing sleeve, and the second retention slot may be configured to extend a length that is equal to the length of the bearing sleeve.

In still further embodiments, a method of manufacturing a bearing sleeve for an air bearing assembly, wherein the air bearing assembly is configured to support a turbomachinery shaft, is provided. The method may include forming a first retention slot in an inner surface of the bearing sleeve, where the first retention slot is configured to engage a first end of a first bearing foil and a first end of a second bearing foil. The method may further include forming a second retention slot in the inner surface of the bearing sleeve, where the second retention slot is configured to engage a second end of the second bearing foil. The first and second bearing foils may be maintained in engagement with the bearing sleeve via engagement of the respective ends with a corresponding one of the first and second retention slots such that the first bearing foil is disposed proximate the inner surface of the bearing sleeve and the second bearing foil is disposed between the first bearing foil and the shaft supported by the bearing sleeve. A cross-section of each of the first and second retention slots may consist of two opposing linear sidewalls and an endwall extending linearly therebetween.

In some cases, forming the first retention slot may comprise forming a plurality of spaced apart first retention slots, where the first retention slots are arranged around a circumference of the inner surface of the bearing sleeve. In some cases, forming the second retention slot may comprise forming a single second retention slot proximate only one of the plurality of first retention slots. Additionally or alternatively, the first retention slot may extend a length that is equal to a length of the bearing sleeve, and the second retention slot may extend a length that is equal to the length of the bearing sleeve. Moreover, forming the first retention slot and forming the second retention slot may comprise using a broaching process.

BRIEF DESCRIPTION OF THE SEVERAL VIEWS OF THE DRAWING(S)

Having thus described the present disclosure in general terms, reference will now be made to the accompanying drawings, which are not necessarily drawn to scale, and wherein:

FIG. 3A is a perspective view of a conventional first bearing foil for use with the conventional air bearing assembly of FIG. 2;

FIG. 3B is a perspective view of a conventional second bearing foil for use with the conventional air bearing assembly of FIG. 2;

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
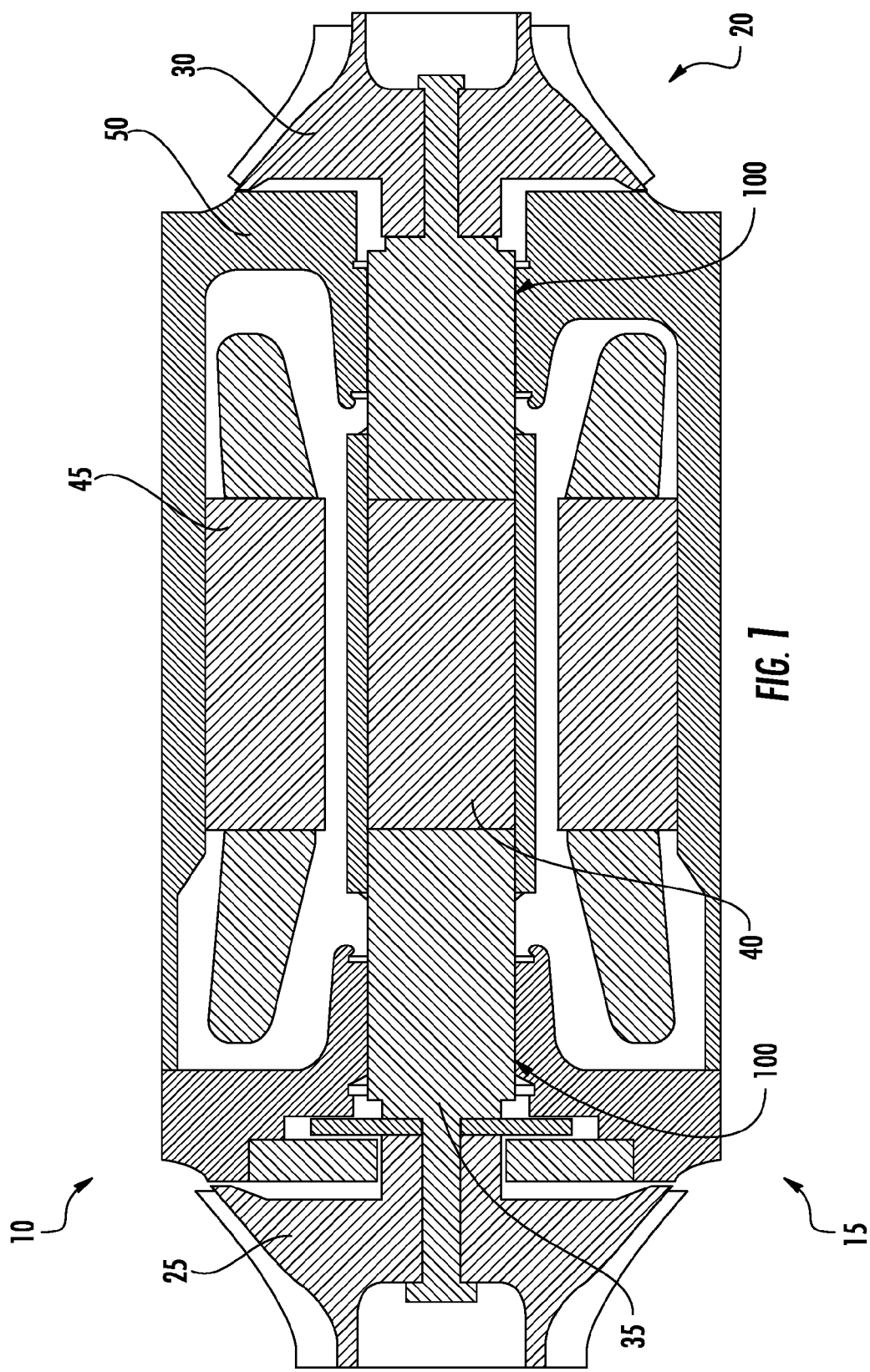
FIG. 1 is a simplified cross-sectional view of a dual-stage compressor in accordance with one embodiment of the invention.

A simplified cross-sectional view of a dual-stage compressor 10 for use with a fuel cell (such as a proton exchange membrane (PEM) fuel cell) is shown in FIG. 1. The dual-stage compressor 10 may include a low pressure side 15 and a high pressure side 20 at respective ends of the compressor. The low pressure side 15 may include a compressor wheel 25 that draws in ambient air at approximately atmospheric pressure and temperature. As the compressor wheel 25 is rotated, the blades of the compressor wheel compress the ambient air to a first pressure, such as a pressure of approximately 2 times atmospheric pressure. This "low pressure" air is routed to the high pressure side 20 of the dual-stage compressor 10, where another compressor wheel 30 further compresses the air to a second pressure, such as a pressure of approximately 4 times atmospheric pressure. This "high pressure" air is then fed to the cathode side of a fuel cell (not shown), where it provides oxygen for the fuel cell reaction to produce electricity.

As shown in FIG. 1, the compressor wheels 25, 30 are attached to opposite ends of a rotating shaft, or rotor 35. In the case of a motor-driven dual-stage compressor, the rotor 35 may include a section having a magnet(s) 40 within or wrapped around the rotor that, in cooperation with a motor stator 45, drives the rotor. In this regard, the motor stator 45 may be opposingly disposed with respect to the rotor (e.g., spaced from and surrounding the rotor), such that an electric current (e.g., from the fuel cell) can rotate the rotor 35 to compress the air as described above. The rotor 35 may be supported within a housing 50 by a bearing assembly. In embodiments described herein, the bearing assembly is an air bearing assembly 100.

Figure 2:
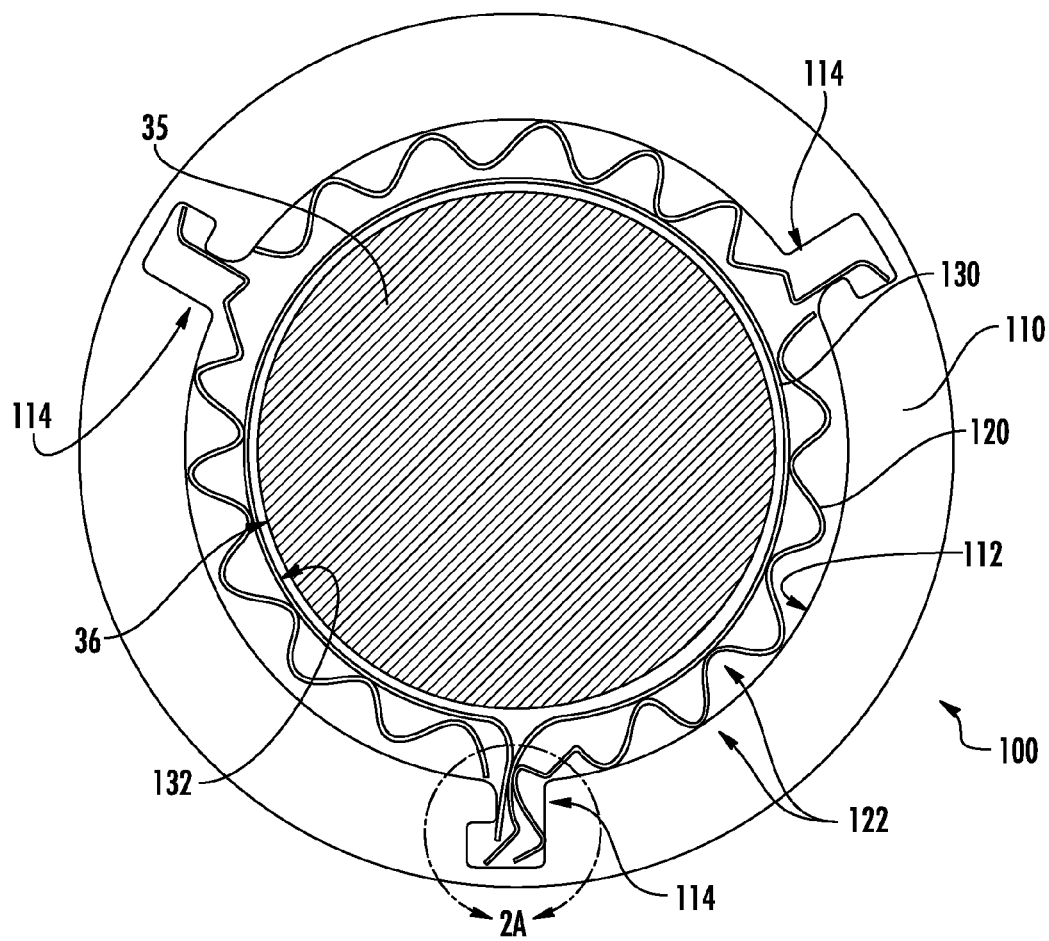
FIG. 2 is a cross-sectional view of a conventional air bearing assembly.
Figure 2A:
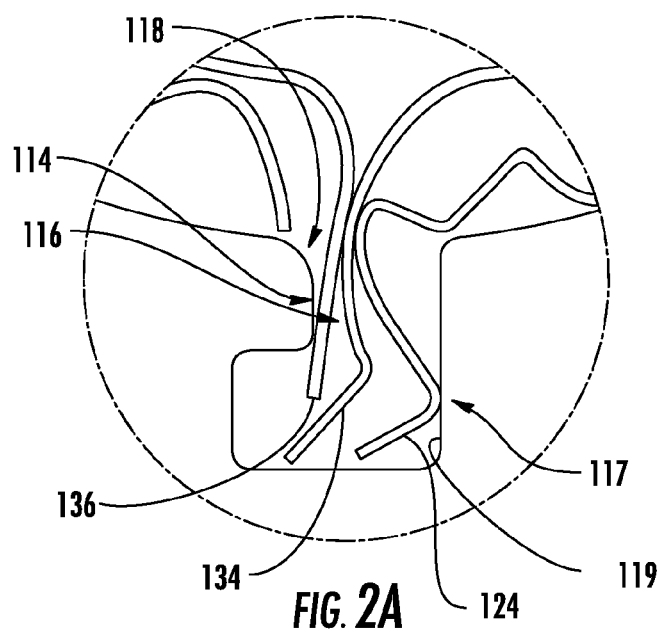
FIG. 2A is a detail cross-sectional view showing the profile of a slot of the conventional air bearing assembly of FIG. 2.

A cross-sectional view of a conventional air bearing assembly 100 is shown in FIGS. 2 and 2A. In general, an air bearing may comprise a bearing sleeve 110, a first bearing foil 120 disposed near the inner surface 112 of the bearing sleeve, and a second bearing foil 130 disposed between the first bearing foil and the rotor 35. The first (or outer) bearing foil 120 may include undulations 122 or "bumps" that are configured to serve as a structural spring that allows the second bearing foil 130 to move in response to hydrodynamic pressure changes due to static and dynamic loads, rotor centrifugal and thermal growth, etc., when the compressor is in operation. In particular, when the rotor 35 is stationary (not rotating), an inner surface 132 of the second bearing foil 130 may be in contact with the outer surface 36 of the rotor. When the rotor 35 is rotating fast enough, however, air is pulled into the bearing assembly 100 via viscosity effects. This high pressure air pushes the second bearing foil 130 away from the rotor 35, such that there is no more contact between the inner surface 132 of the second bearing foil 130 and the outer surface 36 of the rotor 35. The rotor 35, in effect, is supported by a cushion of air and experiences very little friction or wear as a result. The first bearing foil 120 may counteract the outward force of the air against the second bearing foil 130 and may, thus, help to keep the first bearing foil in place in a surrounding relationship with respect to the portion of the rotor 35 supported by the bearing sleeve 110.

In some cases, the inner surface 112 of the bearing sleeve 110 is further configured to hold the first and second foils 120, 130 in place around the rotor 35. For example, in some conventional air bearings, the bearing sleeve 110 may include slots 114 formed into the inner surface 112 of the sleeve for holding tanged ends (e.g., ends that include a tang or flange) of the first and second foils 120, 130. As shown in FIGS. 2A and 3A-3B, the first (outer) bearing foil 120 may, for example, have at least one tanged end 124 that is configured (e.g., sized and shaped) to fit into the slot 114. Similarly, the second (inner) bearing foil 130 may have tanged ends 134, 136 that are also configured to fit into the slot 114. In some cases, more than one slot 114 (e.g., three slots as shown in FIG. 2) may be formed in the inner surface 112 of the bearing sleeve 110, and a corresponding number of first bearing foils 120 may be provided having tanged ends 124 configured to fit in respective slots 114. In such cases, as shown in FIG. 2, a single second bearing foil 130 may be provided, where both tanged ends 134, 136 of the second bearing foil are configured to engage one of the slots 114 alongside the corresponding tanged end 124 of only one of the first bearing foils 120, as shown in FIG. 2A.

To maintain the first and second bearing foils 120, 130 in engagement with the bearing sleeve 110, and considering the high rotational speed of the rotor 35 and the resulting force of the air on the first and second bearing foils 120, 130, the slots 114 in conventional air bearing assemblies 100 have a complex, rounded "L" shape, as shown in FIG. 2A. As illustrated, the slot 114 may have a radial portion 116 extending radially from the central axis A of the bearing sleeve 110 (shown in FIG. 2) and a circumferential portion 117 extending substantially perpendicularly from the radial portion. Moreover, part of the inner surface of the bearing sleeve 110 defining the radial portion 116 distal from the circumferential portion 117 may define a taper 118, as shown, to facilitate engagement of the ends 124, 134, 136 of the first and second bearing foils 120, 130 with the slot 114.

The tanged ends 124, 134, 136 of the respective first and second foils 120, 130 may have corresponding shapes to maximize the engagement of the tanged ends with each other and with the slot 114. For example, as shown in FIGS. 2A and 3A, the tanged end 124 of the first bearing foil 120 may include a first leg 126 extending at an angle $\alpha_1$ of between about 60° to 120° (such as approximately perpendicularly) with respect to a main portion 125 of the first bearing foil. The tanged end 124 may also include a second leg 127 extending at an angle $\beta_1$ of between about 75° to 105° (such as approximately perpendicularly) with respect to the first leg 126. Although certain ranges of angles $\alpha_1$, $\beta_1$ are provided above for explanatory purposes, it is understood that the tanged ends 124, 134, 136 may be configured such that the angles $\alpha_1$, $\beta_1$ may be any angle, e.g., greater than or less than the angles noted above.

Turning to FIG. 3B, one of the tanged ends 134 of the second bearing foil 130 may similarly include first and second legs 137, 138 angularly extending from a main portion 135 of the second bearing foil. The first leg 137 may, for example, extend at an angle $\alpha_2$ of between about 60° to 120° (such as approximately perpendicularly) with respect to a main portion 135 of the second bearing foil 130, and the second leg 138 may extend, for example, at an angle $\beta_2$ of between about 75° to 105° (such as approximately perpendicularly) with respect to the first leg 137. Due to the corresponding shapes of the tanged end 124 of the first bearing foil 120 and the tanged end 134 of the second bearing foil 130, these tanged ends 124, 134 may be able to nest with each other when inserted into the slot 114, as shown in FIG. 2A.

Although certain ranges of angles $\alpha_2$, $\beta_2$ are provided above for explanatory purposes, it is understood that the tanged ends 124, 134, 136 may be configured such that the angles $\alpha_2$, $\beta_2$ may be any angle, e.g., greater than or less than the angles noted above.

Moreover, the angles $\alpha_1$, $\alpha_2$ at which the first legs 126, 137 extend from the respective main portions 125, 135; the angles $\beta_1$, $\beta_2$ at which the second legs 127, 138 of the tanged ends 124, 134 extend from the respective first legs 126, 137, as well as the direction of extension of the second legs (e.g., towards opposite end of the respective foil 120, 130 in the engaged position shown in FIGS. 2 and 2A) allow the tanged ends 124, 134 to securely engage the slot 114 via engagement with the circumferential portion 117. For example, as shown in FIG. 2A, the direction of extension of the second legs 127, 138 with respect to the first legs 126, 137 may be opposite the direction of extension of the circumferential portion 117 with respect to the radial portion 116 of the slot 114, such that a bend 129, 139 between the respective first and second legs is pushed into the circumferential portion 117 and serves to hold the respective tanged ends 124, 134 of the first and second bearing foils 120, 130 securely engaged with the bearing sleeve 110.

As compared to the tanged end 134 of the second bearing foil 130, the other tanged end 136 may be straight and may have only one leg 133 that extends substantially perpendicularly (e.g., at an angle of approximately 80° to 100°) with respect to the main portion 135 of the second bearing foil. Due to the configuration of the second bearing foil 130 (e.g., the length of the second bearing foil from one tanged end 134 to the other tanged end 136 and/or resiliency in the material used to make the bearing foil), the leg 133 of the tanged end 136 may be biased toward engagement with a corresponding wall 119 of the radial portion 116 of the slot 114, as shown in FIG. 2A, when the compressor is in operation. Engagement of the tanged end 136 with the wall 119 may further encourage engagement of the tanged ends 124, 134 with the circumferential portion 117 of the slot 114 (e.g., by biasing the opposite tanged end 134 of the second bearing foil 130 away from the wall 119), further enhancing the engagement of the respective bearing foils 120, 130 with the bearing sleeve 110.

Because of the complex geometry of the slot 114 shown in FIG. 2A, conventional air bearing sleeves 110 typically rely on wire electrical discharge machining (EDM) processes for formation of the slots. In wire EDM, material is removed from the inner surface 132 of the bearing sleeve 110 by a thin single-strand metal wire (such as a brass wire) that conducts a series of rapidly recurring current discharges in a dielectric liquid. The wire is typically controlled using computer numerical control (CNC) techniques, which allows precision machining of delicate and intricate shapes to be accomplished.

Although the results of EDM processes are precise and reproducible, EDM can be expensive and is not conducive to high-volume manufacturing scenarios. Accordingly, embodiments of the invention provide a rectangular-profile, dual-slot design that replaces the complex "L" shaped single slot of conventional bearing sleeves. As described in greater detail below, the dual-slot design can be produced using a broaching process, which allows for high-volume, low-cost manufacturing of the bearing sleeves. At the same time, the dual-slot design provides for robust engagement of the bearing foils with the bearing sleeves, while allowing easy assembly and installation of the air bearing assemblies and meeting performance specifications for the compressors in which the air bearing assemblies are installed.

Figure 4:
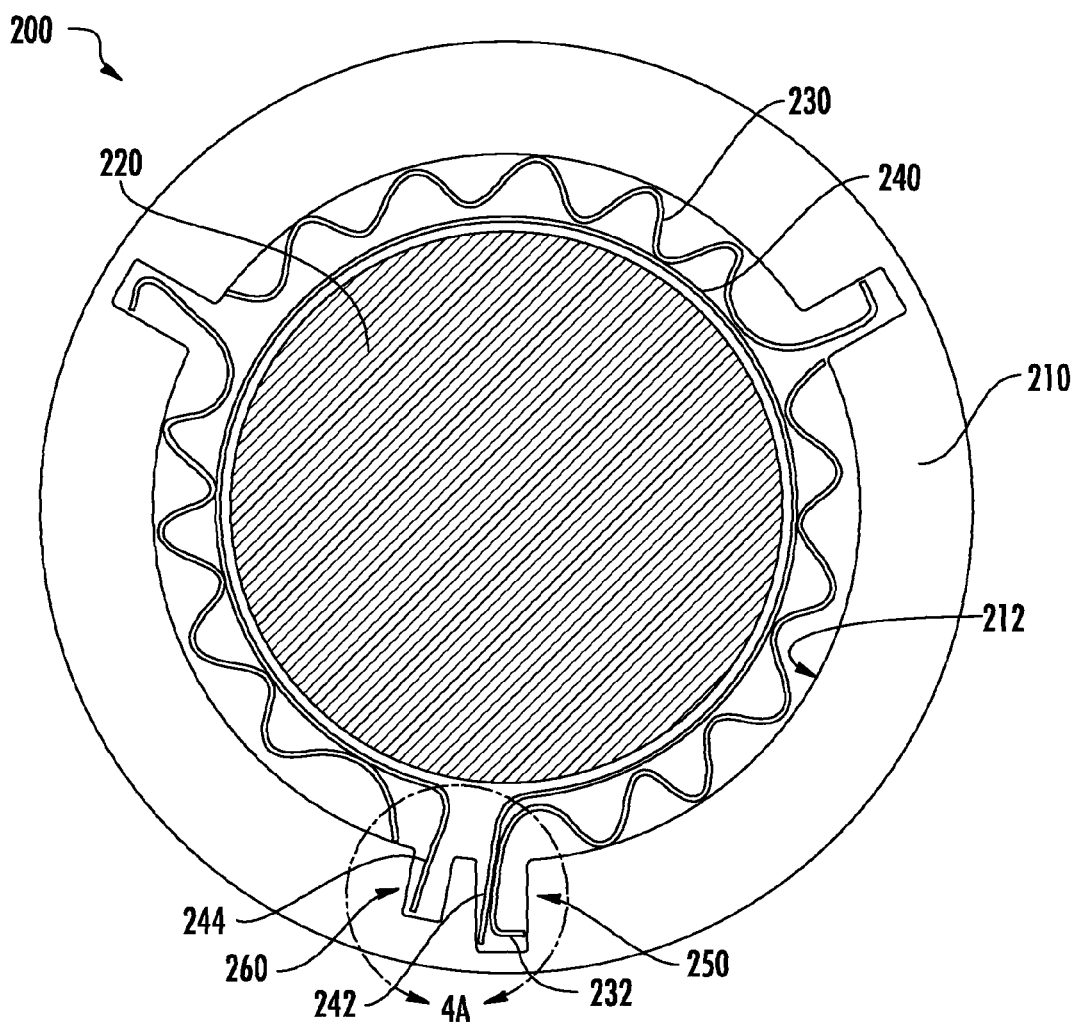
FIG. 4 is a cross-sectional view of an air bearing assembly in accordance with one embodiment of the invention.

Turning now to FIG. 4, an air bearing assembly 200 is provided according to embodiments of the present invention. The air bearing assembly 200 may include a bearing sleeve 210 that is configured to support a rotor 220 of the compressor in which the air bearing assembly is installed. The bearing sleeve 210 may define an inner surface 212, and a first bearing foil 230 may be disposed proximate the inner surface. In the depicted embodiment, three first bearing foils 230 are provided, arranged in series about the circumference of the inner surface 212 of the bearing sleeve 210. The air bearing assembly 200 may further include a second bearing foil 240 disposed between the first bearing foils 230 and the rotor 220. The first and second bearing foils 230, 240 may be constructed of any suitable material to withstand the forces and temperatures that are generated when the compressor is in operation, such as metal and metal alloys including Nickel-based superalloys (e.g., Inconel® alloy). As noted above with respect to the first bearing foil 120 of FIG. 2, the first bearing foils 230 in some embodiments (e.g., as depicted in the figures) may include undulations that allow the first bearing foils to act as structural springs, allowing the second bearing foil 130 to move in response to hydrodynamic pressure changes within the air bearing when the compressor is in operation.

The inner surface 212 of the bearing sleeve 210 may define a first retention slot 250 and a second retention slot 260 spaced from the first retention slot. The first retention slot 250 may be configured to engage a first end 232 of a first bearing foil 230 and a first end 242 of the second bearing foil 240, whereas the second retention slot 260 may be configured to engage a second end 244 of the second bearing foil 240. In this way, the first and second bearing foils 230, 240 may be maintained in engagement with the bearing sleeve 210 via engagement of the respective ends 232, 242, 244 with a corresponding one of the first and second retention slots 250, 260.

In the embodiment of FIG. 4, the inner surface 212 of the bearing sleeve 210 defines three first retention slots 250 configured to engage corresponding first ends 232 of the three first bearing foils 230. The inner surface 212 of the bearing sleeve 210 depicted in FIG. 4, however, defines a single second retention slot 260 disposed proximate only one of the plurality of first retention slots 250. The slots 250, 260 may be configured such that the first retention slot 250 extends a length that is equal to a length of the bearing sleeve 210, and the second retention slot 260 extends a length that is equal to the length of the bearing sleeve 210, as shown and described in greater detail below.

Figure 4A:
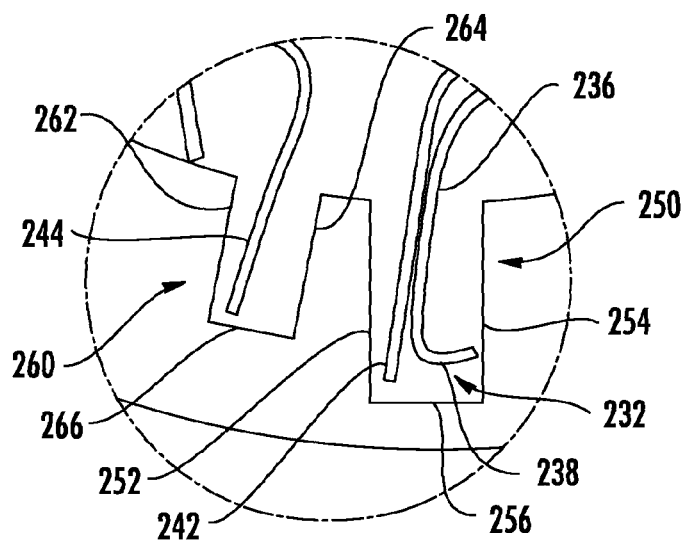
FIG. 4A is a detail cross-sectional view showing the profile of a slot of the air bearing assembly of FIG. 4 in accordance with one embodiment of the invention.

With reference to FIG. 4A, a cross-section of at least one of the first and second retention slots 250, 260 may consist of two opposing linear sidewalls 252, 254, 262, 264 and an endwall 256, 266 extending linearly therebetween. In the depicted embodiment, for example, each of the first and second retention slots 250, 260 consists of two opposing linear sidewalls 252, 254, 262, 264 and an endwall 256, 266 extending linearly therebetween. In some cases, one or both of the first and second retention slots 250, 260 may have a rectangular profile, in which the two opposing linear sidewalls 252, 254, 262, 264 may be substantially parallel to each other and substantially perpendicular to the respective endwall 256, 266.

Figure 5B:
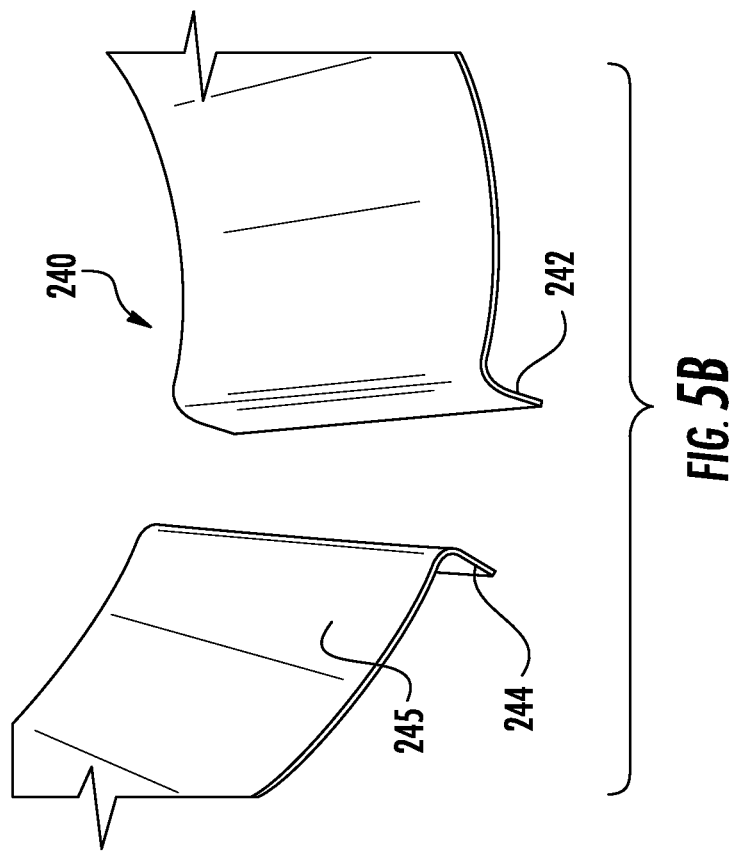
FIG. 5B is a perspective view of a second bearing foil for use with the air bearing assembly of FIG. 2 in accordance with one embodiment of the invention.
Figure 5A:
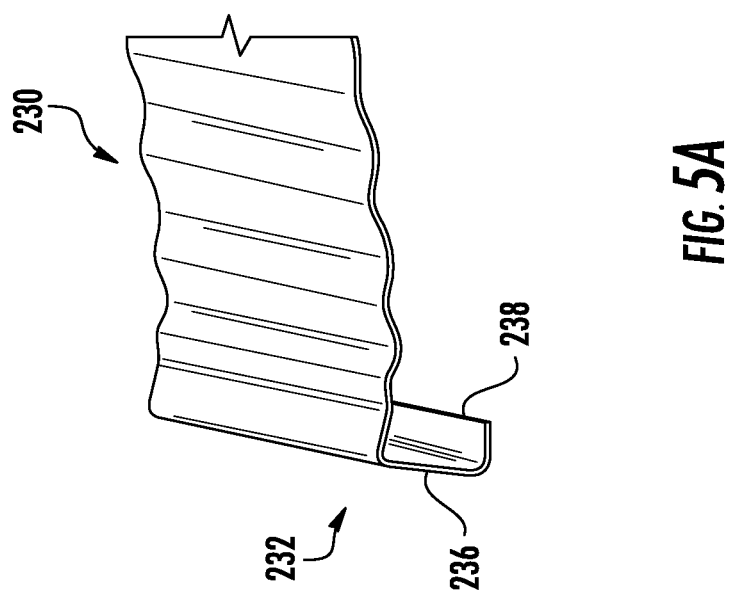
FIG. 5A is a perspective view of a first bearing foil for use with the air bearing assembly of FIG. 2 in accordance with one embodiment of the invention.

In some embodiments, the first end 232 of the first bearing foils 230 may comprise a tang defining an L-bend. The tang may be configured to engage the first retention slot 250 such that a first leg 236 of the L-bend is disposed proximate a sidewall 252 of the first retention slot and a second leg 238 of the L-bend is disposed proximate the endwall 256 of the first retention slot. A first bearing foil 230 is depicted alone (e.g., in an uninstalled configuration) in FIG. 5A.

The first and second ends 242, 244 of the second bearing foil 240, in contrast, may be configured such that each end defines a straight tang. Thus, as shown, the first and second ends 242, 244 may be defined by a single portion of the second bearing foil 240 that is bent with respect to the main portion 245, such that each of the ends 242, 244 is substantially perpendicular to the main portion from which it extends (e.g., extending at an angle of approximately 80° to) 100°. The straight tang forming the first end 242 of the second bearing foil 240 may thus be positioned between the linear sidewall 252 in FIG. 4A and the first leg 236 of the tang defined by the first end 232 of the first bearing foil 230 when the bearing foils 230, 240 are in position within the slots 250, 260.

In this way, the first end 232 of one of the first bearing foils 230 may engage the first end 242 of the second bearing foil 240, such as through contact with a proximate surface of the first end of the second bearing foil, when the compressor is in operation. This may occur, for example, due to the configuration (e.g., size, shape, and material) of the first end 232 of the first bearing foil 230 with respect to the configuration (e.g., length, depth, and width) of the slot 250 as shown in FIG. 4A, as well as the tendency of the first end 242 of the second bearing foil 240 to move towards the first end 232 of the corresponding first bearing foil 230 when the compressor is in operation.

Along these lines, the second end 244 of the second bearing foil 240 may also have the tendency to move, within the second retention slot 260, away from the first end 242 that is in the first retention slot 250, towards the linear sidewall 262 of the second retention slot. The cooperation and interplay of the first ends 232, 242 of the first and second bearing foils 230, 240, respectively, within the first retention slot 250, coupled with the engagement of the second end 244 of the second bearing foil 240 with the second retention slot 260, may thus maintain the first and second bearing foils in engagement with the bearing sleeve 210 during operation of the compressor.

Figure 6:
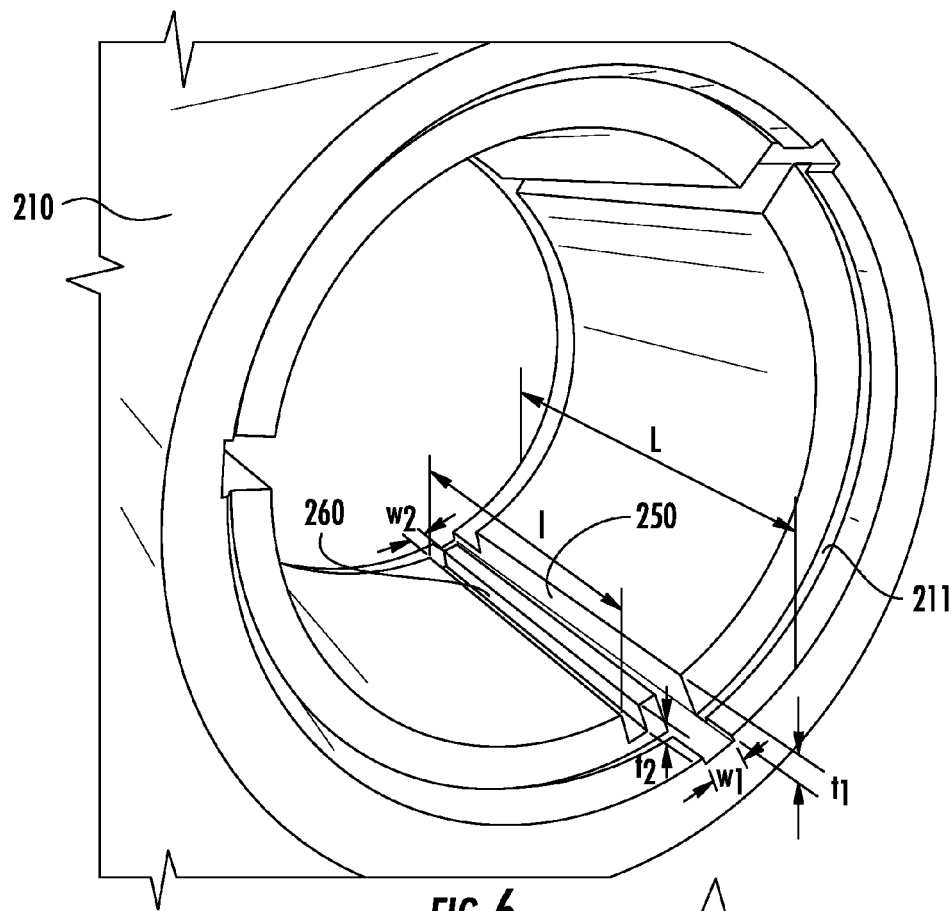
FIG. 6 is a perspective view of an inner surface of a bearing sleeve in accordance with one embodiment of the invention.
Figure 6A:
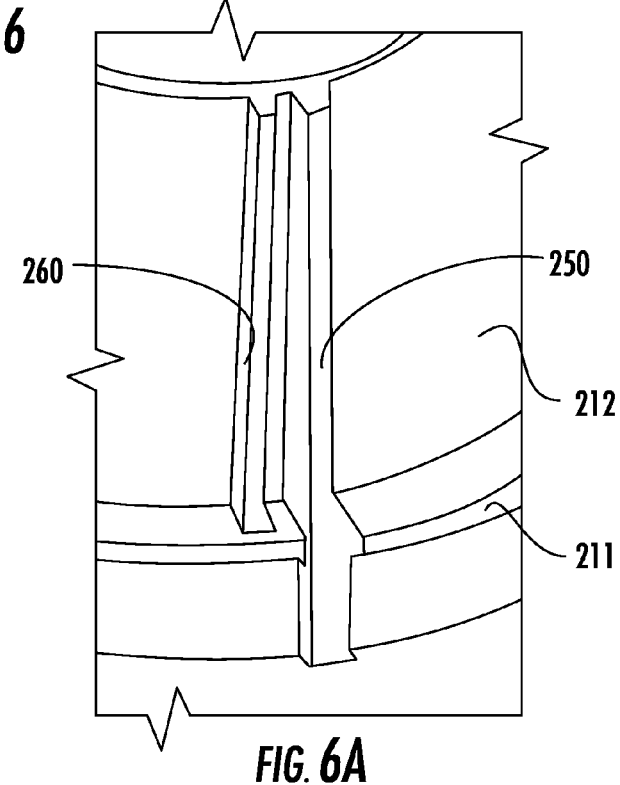
FIG. 6A is a detail view of a first retention slot and a second retention slot of the bearing sleeve of FIG. 6 in accordance with one embodiment of the invention.

Accordingly, in some embodiments, the first retention slot 250 and the second retention slot 260 may be configured to extend a length/that is substantially equal to a length L of the bearing sleeve 210, as shown in FIGS. 6 and 6A. Moreover, in some embodiments, an end ring retainer groove 211 may be provided proximate the open end(s) of the bearing sleeve 210, as shown. Each end ring retainer groove 211 may be configured to hold an end ring retainer, or snap ring, (not shown) within the groove. The end ring retainer, in turn, may be configured to maintain the first and second bearing foils 230, 240 (shown, e.g., in FIGS. 4 and 4A) in place within the bearing sleeve 210, such that movement of the first and second bearing foils along the respective retention slots 250, 260 towards either of the open ends is resisted.

Figure 7:
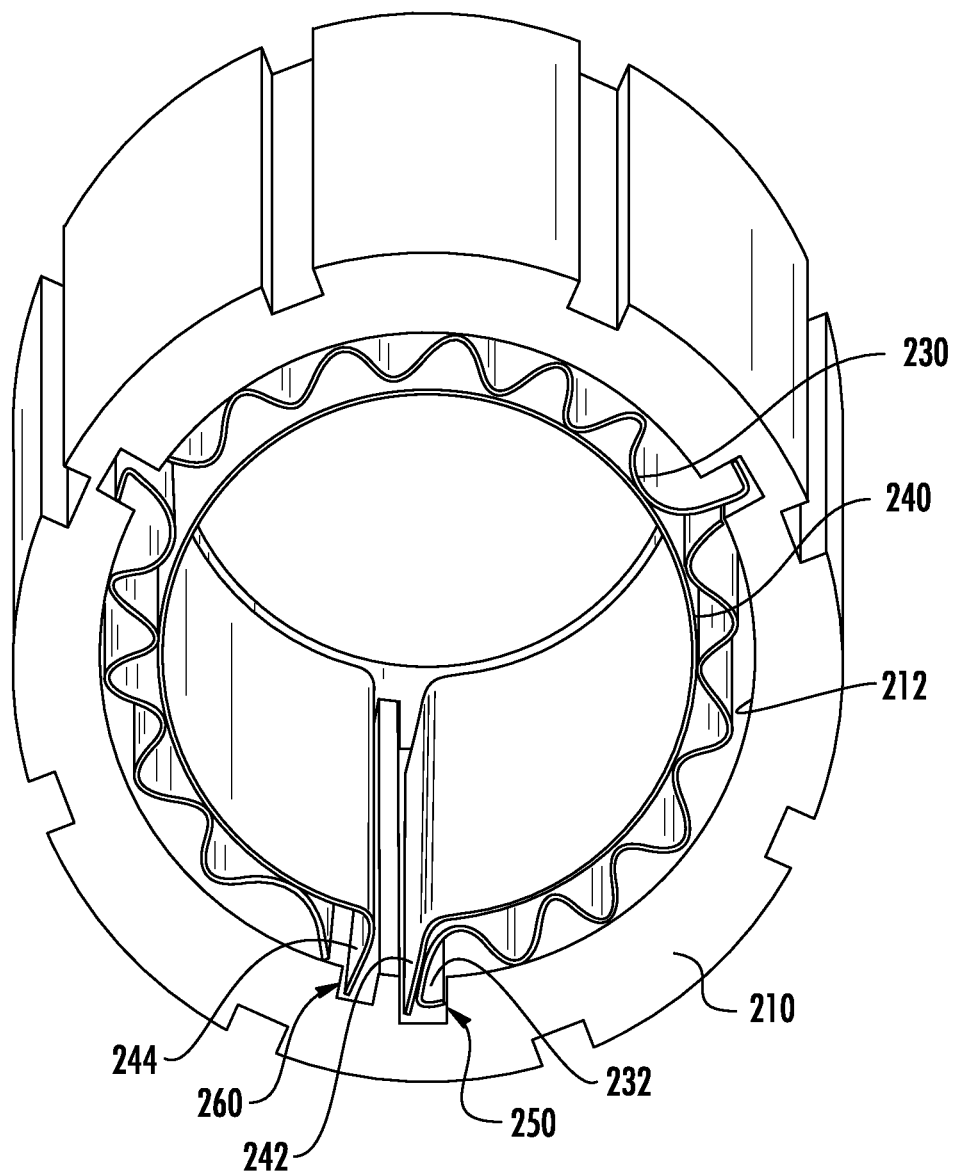
FIG. 7 is a perspective view of a bearing sleeve with first and second bearing foils in accordance with an embodiment of the invention.

As noted above and depicted in FIGS. 4-7, in some embodiments, the first bearing foil 230 includes a plurality of first bearing foils that are configured to be arranged in series around a circumference of the inner surface of the bearing sleeve 210. For example, with reference to FIG. 7, the inner surface 212 of the bearing sleeve 210 may define a plurality of first retention slots 250, where each retention slot 250 is configured to engage a corresponding first end 232 of one of the first bearing foils 230. In this regard, a second end 234 of each of the first bearing foils 230 may be a free end that includes no tangs. The second end 234 may thus be disposed along the inner surface 212 of the bearing sleeve 210, in line with the main portion 235 of the respective first bearing foil 230, as shown. In the depicted embodiment of FIGS. 4 and 7, the first bearing foil 230 comprises three first bearing foils; however, in other embodiments, two, four, five, six, seven, eight, nine, ten, or more first bearing foils 230 may be used.

As described above, in cases in which a number of first bearing foils 230 are used, the inner surface 212 of the bearing sleeve 210 may define a single second retention slot 260 that is disposed proximate only one of the plurality of first retention slots. Thus, the respective first ends 232 of the first bearing foils 230 may be received in and engage with the corresponding first retention slots 250; the first end 242 of the second bearing foil 240 may be received in and engage with one of the first retention slots 250 (the first retention slot that is disposed proximate the second retention slot 260, as shown); and the second end 244 of the second bearing foil 240 may be received in and engage with the second retention slot 260.

Figure 8:
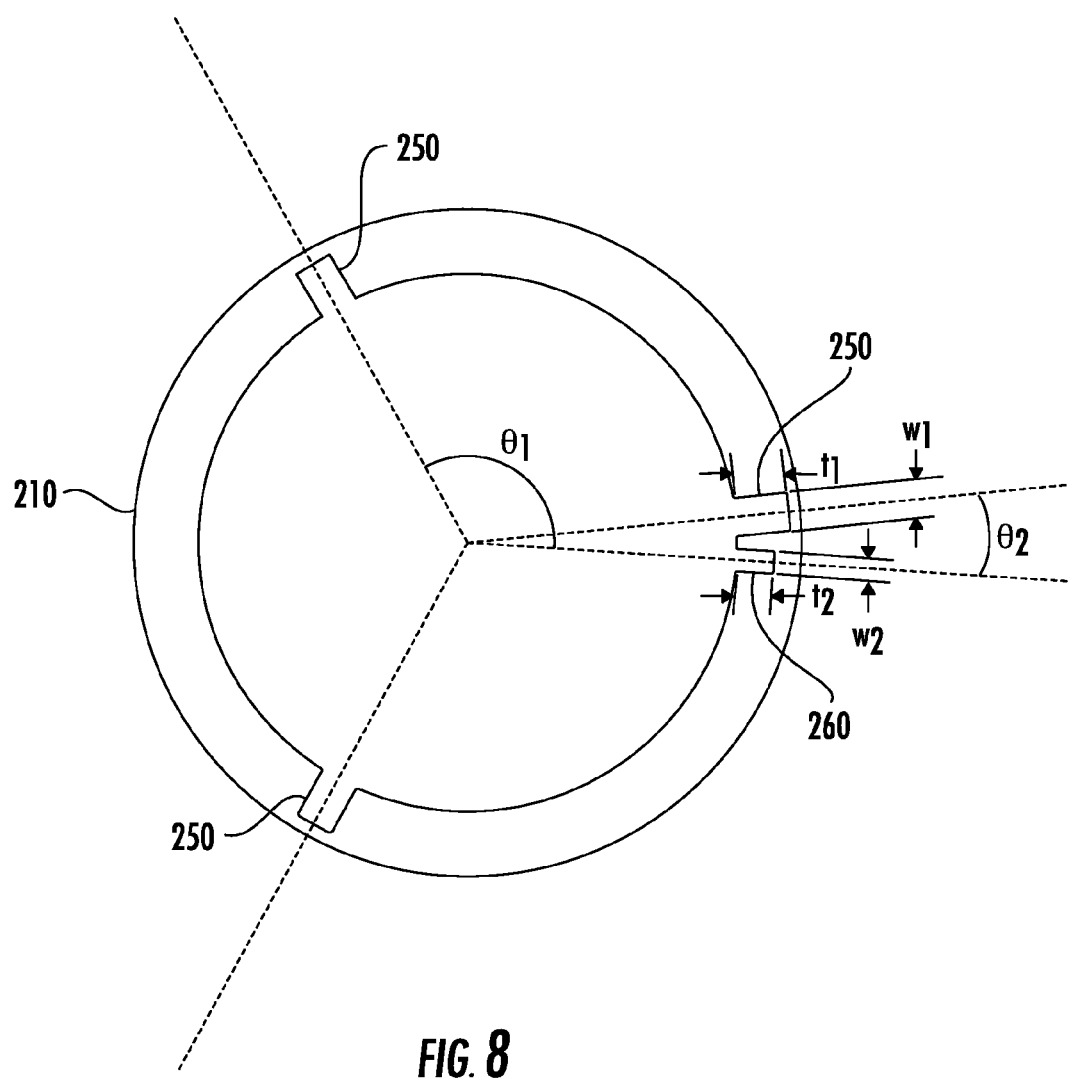
FIG. 8 is a schematic cross-sectional view of the first and second foil retention slots of a bearing sleeve in accordance with an embodiment of the invention.

In some embodiments, the first retention slots 250 may be arranged equidistant from one another about the circumference of the bearing sleeve 210, such that the angle $\theta_1$ corresponding to the difference in the rotational position of adjacent first retention slots 250 is approximately 120°, as shown in FIG. 8, in which three first retention slots are provided. In the depicted example of FIG. 8, the second retention slot 260 may be disposed at a rotational position corresponding to an angle of $\theta_2$ that is between approximately 8° and approximately 12° from the closest first retention slot 250. Although certain ranges of angles $\theta_1$, $\theta_2$ are provided above for explanatory purposes, it is understood that any number of slots may be provided and arranged in a number of ways, such that the angles $\theta_1$, $\theta_2$ may be any angle, e.g., greater than or less than the angles noted above.

In some cases, such as in a bearing sleeve 210 that has a diameter d of approximately 1-inch to approximately 1.5-inches, such as approximately 1.320-inches, the first retention slots 250 may have a width $w_1$ of approximately 0.077-inch to approximately 0.083-inch. The second retention slot 260 may have a width $w_2$ of approximately 0.047-inch to approximately 0.053-inch. Similarly, the first retention slots 250 may be deeper than the second retention slots 260, such as having a depth $t_1$ of approximately 0.097-inch to approximately 0.103-inch, as compared to a depth $t_2$ of approximately 0.072-inch to approximately 0.0078-inch. Moreover, the array of first and second retention slots 250, 260 may be located on a centerline of a bearing housing that is approximately 6-inches in diameter and 8-inches long in some embodiments, with the slots defined at both ends of the rotor 35 shown in FIG. 1. The bearing sleeve 210 may, in some embodiments, be made of aluminum. Although certain dimensions and ranges of dimensions are provided above for explanatory purposes, it is understood that the dimensions, materials, etc. may vary based on the particular size and configuration of the bearing sleeve.

In some embodiments, the location of the second retention slot 260 may be adjustable with respect to one or more of the first retention slots 250. The second retention slot 260 may, for example, be angularly positioned within the bearing sleeve 210 to accommodate or facilitate ease of assembly of the bearing foils 230, 240, to optimize the bearing load when the compressor is operating, and/or to meter or bypass cooling air flow in conjunction with the end ring retainer groove configuration through the bearing assembly into the rotor cavity. In this regard, the first and/or second retention slots 250, 260 may provide a tunable bearing airflow path in conjunction with the end ring retainer groove 211, shown in FIGS. 6 and 6A.

As described above, embodiments of a bearing sleeve 210 for an air bearing assembly 200 are thus described, where the air bearing assembly is designed to support a rotor of a compressor. An inner surface of the bearing sleeve may define a first retention slot that is configured to engage a first end of a first bearing foil and a first end of a second bearing foil. The inner surface of the bearing sleeve may further define a second retention slot that is configured to engage a second end of the second bearing foil. The first and second bearing foils may be maintained in engagement with the bearing sleeve via engagement of the respective ends with a corresponding one of the first and second retention slots, such that the first bearing foil is disposed proximate the inner surface of the bearing sleeve and the second bearing foil is disposed between the first bearing foil and the rotor supported by the bearing sleeve.

In some embodiments, as described above, a cross-section of at least one of the first or second retention slots may consist of two opposing linear sidewalls and an endwall extending linearly therebetween. The first and/or second retention slots may be formed in the inner surface of the bearing sleeve using a broaching process in some cases.

As described above, the inner surface of the bearing sleeve may, in some cases, define a plurality of first retention slots configured to engage corresponding first ends of a plurality of first bearing foils, wherein the plurality of first bearing foils are configured to be arranged in series around a circumference of the inner surface of the bearing sleeve. In such cases, the inner surface of the bearing sleeve may define a single second retention slot disposed proximate only one of the plurality of first retention slots. The slots may be configured such that the first and second retention slots extend a length that is equal to a length of the bearing sleeve. Alternatively, however, a single first bearing foil 230 (e.g., a single piece) may be provided that is configured to extend substantially the circumference of the bearing sleeve.

Moreover, embodiments of a method of manufacturing a bearing sleeve for an air bearing assembly are described above, where the air bearing assembly is configured to support a rotor of a turbocharger or a compressor, such as a motor-driven dual-stage compressor configured for use with a fuel cell. The method may include forming a first retention slot in an inner surface of the bearing sleeve, where the first retention slot is configured to engage a first end of a first bearing foil and a first end of a second bearing foil. The method may further include forming a second retention slot in the inner surface of the bearing sleeve, where the second retention slot may be configured to engage a second end of the second bearing foil, where the first and second bearing foils are maintained in engagement with the bearing sleeve via engagement of the respective ends with a corresponding one of the first and second retention slots such that the first bearing foil is disposed proximate the inner surface of the bearing sleeve and the second bearing foil is disposed between the first bearing foil and the rotor supported by the bearing sleeve.

As described above, the method may include forming a plurality of spaced apart first retention slots, and the first retention slots may be arranged around a circumference of the inner surface of the bearing sleeve. The second retention slot may thus be a single second retention slot that is formed proximate only one of the plurality of first retention slots.

Regardless of the number of retention slots, the first and second retention slots may, in some embodiments, be formed such that each extends a length that is substantially equal to a length of the bearing sleeve. Moreover, in some embodiments, due to the cross-section of the first and/or second retention slots consisting of two opposing linear (e.g., straight) sidewalls and an endwall extending linearly therebetween, the first retention slot and/or the second retention slot may be formed using a broaching process. In this way, a high volume of bearing sleeves may be produced accurately and efficiently at a relatively low cost, especially as compared to conventional bearing sleeves with more complex cross-sections requiring processes such as EDM to form. Moreover, broaching methods may allow for more flexibility in the sizing and grouping of slots.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An air bearing assembly for a turbomachinery shaft comprising:
    a bearing sleeve configured to support a turbomachinery shaft, wherein the bearing sleeve defines an inner surface;
    a first bearing foil disposed proximate the inner surface of the bearing sleeve; and a second bearing foil disposed between the first bearing foil and the shaft supported by the bearing sleeve,
    wherein the inner surface of the bearing sleeve defines a plurality of first retention slots, wherein at least one of the first retention slots is configured to engage a first end of the first bearing foil and a first end of the second bearing foil, and
    wherein the inner surface of the bearing sleeve defines a second retention slot, wherein the second retention slot is located closer to the at least one of the first retention slots that is configured to engage the first end of the first bearing foil than to the other first retention slots and wherein the second retention slot is configured to engage a second end of the second bearing foil, such that the first and second bearing foils are maintained in engagement with the bearing sleeve via engagement of the respective ends with a corresponding one of the first and second retention slots,
    wherein the first end of the first bearing foil comprises a tang defining an L-bend, wherein the tang is configured to engage the respective first retention slot such that a first leg of the L-bend is disposed proximate a sidewall of the first retention slot and a second leg of the L-bend is disposed proximate an endwall of the first retention slot, and wherein the first and second bearing foils do not extend across a gap between the second retention slot and the first retention slot that is configured to engage the first end of the first bearing foil.

2. The air bearing assembly of claim 1, wherein a cross-section of at least one of the first or second retention slots comprises two opposing linear sidewalls and an endwall extending linearly therebetween.

3. The air bearing assembly of claim 1, wherein a cross-section of each of the first and second retention slots comprises two opposing linear sidewalls and an endwall extending linearly therebetween.

4. The air bearing assembly of claim 1, wherein the first bearing foil comprises a plurality of first bearing foils configured to be arranged in series around a circumference of the inner surface of the bearing sleeve, and wherein each of the plurality of first retention slots is configured to engage a corresponding first end of the plurality of first bearing foils.

5. The air bearing assembly of claim 4, wherein the inner surface of the bearing sleeve defines a single second retention slot disposed proximate only one of the plurality of first retention slots.

6. The air bearing assembly of claim 1, wherein the first end of the second bearing foil comprises a straight tang and a second end of the second bearing foil comprises a straight tang.

7. The air bearing assembly of claim 1, wherein each of the first retention slots is configured to extend a length that is equal to a length of the bearing sleeve, and wherein the second retention slot is configured to extend a length that is equal to the length of the bearing sleeve.

8. A bearing sleeve for an air bearing assembly configured to support a turbomachinery shaft, wherein an inner surface of the bearing sleeve defines:
    a plurality of first retention slots, wherein at least one of the first retention slots is configured to engage a first end of a first bearing foil and a first end of a second bearing foil, wherein the first end of the first bearing foil comprises a tang defining an L-bend, wherein the tang is configured to engage the respective first retention slot such that a first leg of the L-bend is disposed proximate a sidewall of the first retention slot and a second leg of the L-bend is disposed proximate an endwall of the first retention slot; and
    a second retention slot located closer to the at least one of the first retention slots that is configured to engage the first end of the first bearing foil than to the other first retention slots, wherein the second retention slot is configured to engage a second end of the second bearing foil,
    wherein the first and second bearing foils are maintained in engagement with the bearing sleeve via engagement of the respective ends with a corresponding one of the first and second retention slots such that the first bearing foil is disposed proximate the inner surface of the bearing sleeve and the second bearing foil is disposed between the first bearing foil and the shaft supported by the bearing sleeve, and
    wherein the first and second bearing foils do not extend across a gap between the second retention slot and the first retention slot that is configured to engage the first end of the first bearing foil.

9. The bearing sleeve of claim 8, wherein a cross-section of at least one of the first or second retention slots comprises two opposing linear sidewalls and an endwall extending linearly therebetween.

10. The bearing sleeve of claim 8, wherein a cross-section of each of the first and second retention slots comprises two opposing linear sidewalls and an endwall extending linearly therebetween.

11. The bearing sleeve of claim 8, wherein the plurality of first retention slots is configured to engage corresponding first ends of a plurality of first bearing foils, wherein the plurality of first bearing foils are configured to be arranged in series around a circumference of the inner surface of the bearing sleeve.

12. The bearing sleeve of claim 11, wherein the inner surface of the bearing sleeve defines a single second retention slot disposed proximate only one of the plurality of first retention slots.

13. The bearing sleeve of claim 8, wherein each of the first retention slots is configured to extend a length that is equal to a length of the bearing sleeve, and wherein the second retention slot is configured to extend a length that is equal to the length of the bearing sleeve.

14. A method of manufacturing a bearing sleeve for an air bearing assembly, wherein the air bearing assembly is configured to support a turbomachinery shaft, the method comprising:

forming a plurality of first retention slots in an inner surface of the bearing sleeve, wherein at least one of the first retention slots is configured to engage a first end of a first bearing foil and a first end of a second bearing foil, wherein the first end of the first bearing foil comprises a tang defining an L-bend, wherein the tang is configured to engage the respective first retention slot such that a first leg of the L-bend is disposed proximate a sidewall of the first retention slot and a second leg of the L-bend is disposed proximate an endwall of the first retention slot; and forming a second retention slot in the inner surface of the bearing sleeve at a location closer to the at least one of the first retention slots that is configured to engage the first end of the first bearing foil than to the other first retention slots, wherein the second retention slot is configured to engage a second end of the second bearing foil, wherein the first and second bearing foils are maintained in engagement with the bearing sleeve via engagement of the respective ends with a corresponding one of the first and second retention slots such that the first bearing foil is disposed proximate the inner surface of the bearing sleeve and the second bearing foil is disposed between the first bearing foil and the shaft supported by the bearing sleeve, and wherein the first and second bearing foils do not extend across a gap between the second retention slot and the first retention slot that is configured to engage the first end of the first bearing foil.

15. The method of claim 14, wherein a cross-section of each of the first and second retention slots comprises two opposing linear sidewalls and an endwall extending linearly therebetween.

16. The method of claim 14, wherein the first retention slots are arranged around a circumference of the inner surface of the bearing sleeve.

17. The method of claim 16, wherein forming the second retention slot comprises forming a single second retention slot proximate only one of the plurality of first retention slots.

18. The method of claim 14, wherein each of the first retention slots extends a length that is equal to a length of the bearing sleeve, and wherein the second retention slot extends a length that is equal to the length of the bearing sleeve.

19. The method of claim 14, wherein forming the first retention slots and forming the second retention slot comprises using a broaching process.

* * * * *